United States Patent
Kim et al.

(10) Patent No.: US 11,665,702 B2
(45) Date of Patent: May 30, 2023

(54) METHOD AND DEVICE FOR TRANSMITTING DOWNLINK CONTROL INFORMATION FOR SUPPORTING NON-ORTHOGONAL MULTIPLE ACCESS IN WIRELESS COMMUNICATION SYSTEM

(71) Applicant: Samsung Electronics Co., Ltd., Gyeonggi-do (KR)

(72) Inventors: Taehyoung Kim, Gyeonggi-do (KR); Youngbum Kim, Gyeonggi-do (KR); Seunghoon Choi, Gyeonggi-do (KR); Taehan Bae, Gyeonggi-do (KR)

(73) Assignee: Samsung Electronics Co., Ltd

( * ) Notice: Subject to any disclaimer, the term of this patent is extended or adjusted under 35 U.S.C. 154(b) by 153 days.

(21) Appl. No.: 16/959,599

(22) PCT Filed: Jan. 4, 2019

(86) PCT No.: PCT/KR2019/000143
§ 371 (c)(1),
(2) Date: Jul. 1, 2020

(87) PCT Pub. No.: WO2019/135632
PCT Pub. Date: Jul. 11, 2019

(65) Prior Publication Data
US 2021/0084621 A1 Mar. 18, 2021

(30) Foreign Application Priority Data
Jan. 4, 2018 (KR) .................. 10-2018-0001363

(51) Int. Cl.
*H04W 72/23* (2023.01)
(52) U.S. Cl.
CPC .................... *H04W 72/23* (2023.01)

(58) Field of Classification Search
CPC .......... H04W 72/042; H04W 72/0413; H04W 72/121
See application file for complete search history.

(56) References Cited

U.S. PATENT DOCUMENTS

| 10,149,318 B2 | 12/2018 | Sun et al. |
| 2016/0066345 A1 | 3/2016 | Sun et al. |

(Continued)

FOREIGN PATENT DOCUMENTS

| KR | 1020170048377 | 5/2017 | |
| WO | WO-2016154991 A1 * | 10/2016 | ............ H04W 72/04 |

(Continued)

OTHER PUBLICATIONS

PCT/ISA/210 Search Report issued on PCT/KR2019/000143, dated Apr. 19, 2019, pp. 5.

(Continued)

*Primary Examiner* — Elton Williams
(74) *Attorney, Agent, or Firm* — The Farrell Law Firm, P.C.

(57) ABSTRACT

The present disclosure relates to: a communication method for converging an IoT technology with a 5G communication system for supporting a higher data transfer rate beyond the 4G system; and a system therefor. The present disclosure can be applied to intelligent services (for example, smart homes, smart buildings, smart cities, smart cars or connected cars, healthcare, digital education, retail business, security and safety services, etc.) on the basis of 5G communication technologies and IoT-related technologies. The present invention provides a method and device for supporting a non-orthogonal multiple access (NOMA) transmission mode and, more specifically, provides: a method and device for configuring a NOMA transmission mode for a terminal; and a method and device for transmitting, to a terminal, control information for scheduling NOMA uplink data trans- (Continued)

mission by a base station when a NOMA transmission mode is configured for the terminal.

16 Claims, 14 Drawing Sheets

(56) References Cited

U.S. PATENT DOCUMENTS

| | | | |
|---|---|---|---|
| 2017/0013599 A1 | 1/2017 | Sun et al. | |
| 2017/0290046 A1* | 10/2017 | Sun | H04L 5/0053 |
| 2018/0288746 A1* | 10/2018 | Zhang | H04L 5/0048 |
| 2019/0150097 A1 | 5/2019 | Seo et al. | |

FOREIGN PATENT DOCUMENTS

| | | |
|---|---|---|
| WO | WO 2017/196025 | 11/2017 |
| WO | WO2017196025 | 11/2017 |

OTHER PUBLICATIONS

PCT/ISA/237 Written Opinion issued on PCT/KR2019/000143, dated Apr. 19, 2019, pp. 5.
Samsung, 'Consideration on NoMA study', R1-1720365, 3GPP TSG RAN WG1 Meeting #91, Nov. 18, 2017, pp. 6.
Huawei et al., 'Discussion on NoMA study for Rel-15 Si', R1-1720607, 3GPP TSG RAN WG1 Meeting #91, Nov. 18, 2017, pp. 9.
European Search Report dated Nov. 26, 2020 issued in counterpart application No. 19736025.8-1215, 8 pages.
Huawei, HiSilicon, "Discussion on NoMA Study for Rel-15 SI", R1-1720607, 3GPP TSG RAN WG1 Meeting #91, Nov. 27-Dec. 1, 2017, 7 pages.
Samsung, "Consideration on NoMA Study", R1-1720365, 3GPP TSG RAN WG1 Meeting 91, Nov. 27-Dec. 1, 2017, 4 pages.
Samsung, "Procedures Related Consideration to NOMA", R1-1810851, 3GPP TSG RAN WG1 Meeting #94bis, Oct. 8-12, 2018, 5 pages.
Korean Office Action dated Jan. 16, 2023 issued in counterpart application No. 10-2018-0001363, 4 pages.

* cited by examiner

METHOD AND DEVICE FOR TRANSMITTING DOWNLINK CONTROL INFORMATION FOR SUPPORTING NON-ORTHOGONAL MULTIPLE ACCESS IN WIRELESS COMMUNICATION SYSTEM

PRIORITY

This application is a National Phase Entry of PCT International Application No. PCT/KR2019/000143 which was filed on Jan. 4, 2019, and claims priority to Korean Patent Application No. 10-2018-0001363, which was filed on Jan. 4, 2018, the content of each of which is incorporated herein by reference.

TECHNICAL FIELD

The disclosure relates to a method for transmitting downlink control information for efficiently supporting non-orthogonal multiple access (NOMA) in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

As described above, as various services can be provided with the development of wireless communication systems, methods for properly providing these services are required. In particular, a 5G communication system considers introducing non-orthogonal multiple access (NOMA) that enables a plurality of terminals to perform transmission and reception by sharing the same time and frequency resources in order to support very high connectivity.

DISCLOSURE OF INVENTION

Technical Problem

Non-orthogonal multiple access is performed based on a scheduling request and an uplink grant, in which case simultaneous accesses by a great number of terminals are supported, thus significantly increasing overhead in downlink control signal transmission.

Solution to Problem

To solve the foregoing problem, according to the disclosure, a signal reception method of a base station in a wireless communication system includes: transmitting configuration information for configuring downlink control information reception, based on a group-common radio network temporary identifier (RNTI); generating downlink control information for a plurality of user equipments (UEs) which is scrambled with the group-common RNTI; transmitting the downlink control information to the plurality of UEs; and receiving a plurality of pieces of data for non-orthogonal multiple access from the plurality of UEs on the same time-frequency resource, based on the downlink control information.

The configuration information may be transmitted via a higher-layer signaling. The downlink control information may include common control information commonly applied to the plurality of UEs and UE-specific control information applied to each of the plurality of UEs. The common control information may include time and frequency resource allocation information for at least data transmission, and the UE-specific control information may include information about retransmission of data transmitted at least by each UE.

A signal transmission method of a user equipment (UE) in a wireless communication system includes: receiving configuration information for configuring downlink control information reception, based on a group-common radio network temporary identifier (RNTI); receiving downlink control information using the group-common RNTI; and transmitting data for non-orthogonal multiple access on a time-frequency resource indicated by the downlink control information.

A base station for receiving a signal in a wireless communication system includes: a transceiver; and a controller configured to be connected to the transceiver and to perform control to transmit configuration information for configuring downlink control information reception, based on a group-common radio network temporary identifier (RNTI), to generate downlink control information for a plurality of user equipments (UEs) which is scrambled with the group-common RNTI, to transmit the downlink control information to the plurality of UEs, and to receive a plurality of pieces of data for non-orthogonal multiple access from the plurality of UEs on the same time-frequency resource, based on the downlink control information.

A user equipment (UE) for transmitting a signal in a wireless communication system includes: a transceiver; and a controller configured to be connected to the transceiver and to perform control to receive configuration information for configuring downlink control information reception, based on a group-common radio network temporary identifier (RNTI), to receive downlink control information using the group-common RNTI, and to transmit data for non-orthogonal multiple access on a time-frequency resource indicated by the downlink control information.

Advantageous Effects of Invention

According to a non-orthogonal multiple access configuration method and a downlink control information transmission method for supporting non-orthogonal multiple access proposed in the disclosure, it is possible to reduce overhead in downlink control signal transmission for uplink data channel scheduling for a plurality of terminals performing non-orthogonal multiple access, thus efficiently transmitting a downlink control signal and securing connectivity for a greater number of UEs.

MODE FOR THE INVENTION

Figure 1:
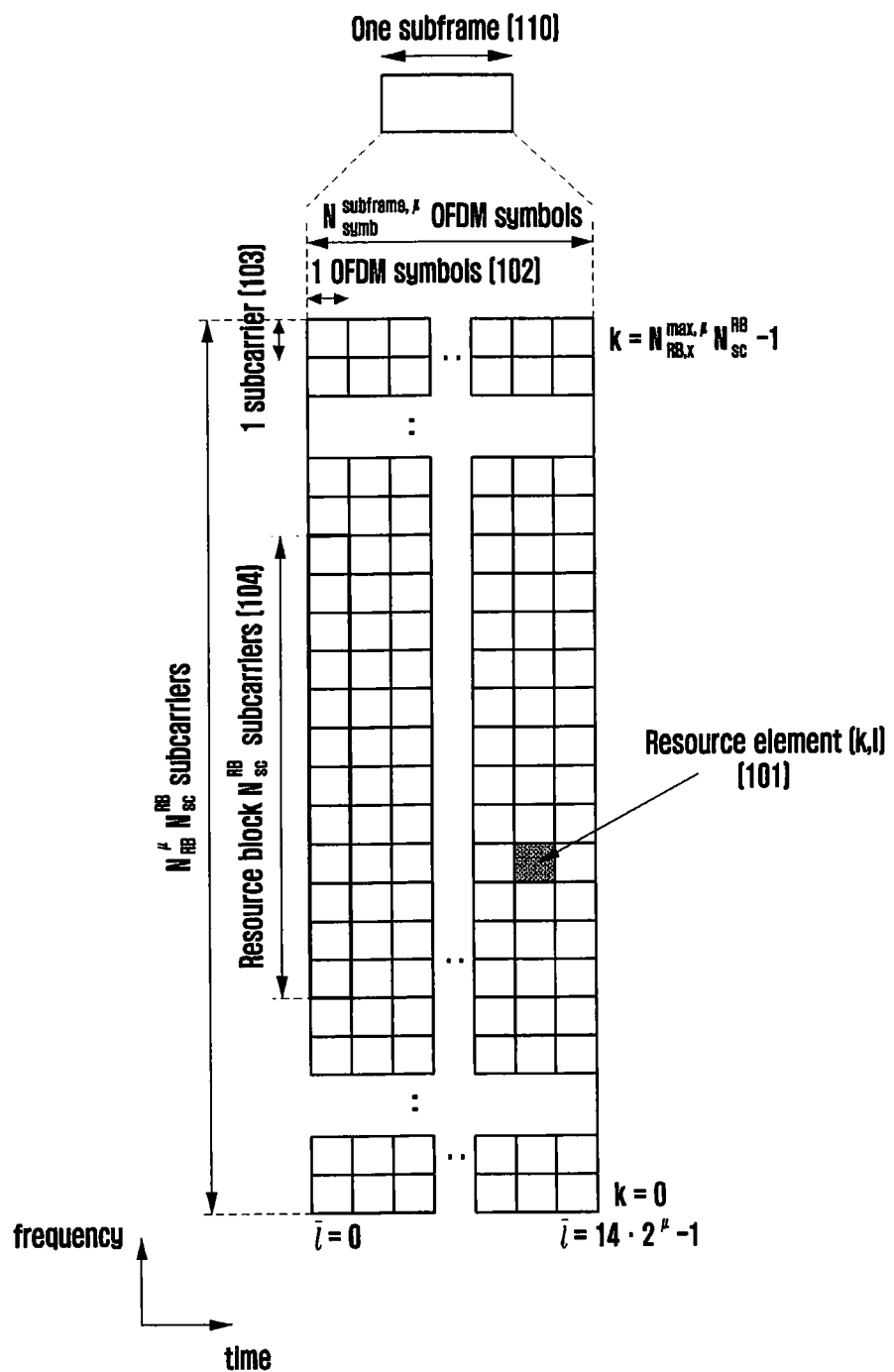
FIG. 1 illustrates the basic structure of a time-frequency domain in a 5G system.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

Hereinafter, a base station is an entity that performs resource allocation for a terminal and may be at least one of a gNode B, an eNode B, a Node B, a base station (BS), a radio access unit, a base station controller, or a node in a network. A terminal may include a user equipment (UE), a mobile station (MS), a cellular phone, a smartphone, a computer, or a multimedia system capable of performing a communication function. In the disclosure, a downlink (DL) is a wireless transmission path for a signal transmitted from a base station to a terminal, and an uplink (UL) is a wireless transmission path for a signal transmitted from a terminal to a base station. Although embodiments of the disclosure will be described with reference to an LTE or LTE-A system as an example, these embodiments of the disclosure may also be applied to other communication systems having a similar technical background or channel form. For example, 5G mobile communication technology (5G or new radio (NR)) developed after LTE-A may be included in these systems, and a 5G system illustrated below may be a concept including existing LTE, LTE-A, and other similar services. The disclosure may be partially modified and applied to other communication systems by a person skilled in the art without departing from the scope of the disclosure.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system is evolving from initially providing voice-oriented services into a broadband wireless communication system for providing high-speed and high-quality packet data services according to a communication standard, for example, high speed packet access (HSPA), long-term evolution (LTE or evolved universal terrestrial radio access (E-UTRA)), LTE-advanced (LTE-A), or LTE-Pro of the 3GPP, high rate packet data (HRPD) or ultra mobile broadband (UMB) of the 3GPP2, and IEEE 802.16e.

As a representative example of the broadband wireless communication system, an LTE system employs an orthogonal frequency division multiplexing (OFDM) scheme for a downlink (DL) and employs a single-carrier frequency division multiple access (SC-FDMA) scheme for an uplink (UL). The uplink refers to a radio link for a user equipment (UE) or a mobile station (MS) to transmit data or a control signal to an eNode B or a base station (BS), and the downlink refers to a radio link for the eNode B to transmit data or a control signal to the UE. These multiple access schemes generally allocate and manage time-frequency resources for carrying data or control information per user not to overlap with each other, that is, to be orthogonal to each other, thereby dividing data or control information for each user.

A post-LTE communication system, that is, a 5G communication system (hereinafter, interchangeable with a 5G system) needs to be able to freely reflect various demands from users and service providers and is thus required to support services satisfying various requirements at the same time. Services considered for a 5G communication system include enhanced mobile broadband (eMBB), massive machine-type communication (mMTC), ultra reliability and low latency communications (URLLC), and the like.

eMBB is intended to provide a further enhanced data rate than that supported by existing LTE, LTE-A, or LTE-Pro systems. For example, in a 5G communication system, for one base station, eMBB needs to be able to provide a peak data rate of 20 Gbps in a downlink and a peak data rate of 10 Gbps in an uplink. Further, the 5G communication system needs not only to provide the peak data rate but also to provide an increased user-perceived data rate. In order to meet these requirements, various improved transmission and reception technologies including an enhanced multiple-input and multiple-output (MIMO) transmission technology are required. In addition, while a current LTE system transmits a signal using a transmission bandwidth of up to 20 MHz in a 2-GHz band, the 5G communication system may employ a frequency bandwidth wider than 20 MHz for signal transmission in a frequency band ranging from 3 to 6 GHz or a 6-GHz frequency band or higher, making it possible to satisfy a data rate required for the 5G communication system.

In the 5G communication system, mMTC is taken into consideration to support application services, such as the Internet of things (IoT). To efficiently provide the IoT, mMTC requires support for access of a great number of UEs in a cell, enhanced UE coverage, increased battery time, reduced UE cost, and the like. The IoT is attached to various sensors and various devices to provide a communication function and thus needs to be able to support a large number of UEs (e.g., 1,000,000 UEs/km$^2$) in a cell. A UE supporting mMTC is highly likely to be located in a shadow area not covered by a cell, such as the basement of a building, due to the nature of services and thus requires wider coverage than for other services provided by the 5G communication system. A UE supporting mMTC needs to be configured as a low-cost UE, and requires a very long battery life time of 10 to 15 years because it is difficult to frequently change the battery of the UE.

Finally, URLLC is a mission-critical cellular-based wireless communication service. URLLC may be used, for example, for remote control of robots or machinery, industrial automation, unmanned aerial vehicles, remote health care, emergency alerts, and the like. Therefore, URLLC needs to provide ultralow-latency and ultrahigh-reliability communication. For example, a URLLC-supporting service is required not only to satisfy an air interface latency of less than 0.5 milliseconds but also to have a packet error rate of $10^{-5}$ or less. Therefore, for the URLLC-supporting service, a 5G system needs to provide a shorter transmission time interval (TTI) than that of other services and also requires a design for allocating a wide resource in a frequency band in order to secure the reliability of a communication link.

The three services of the 5G system, that is, mMTC, URLLC, and eMBB, may be transmitted via multiplexing in one system. Here, different transmission and reception schemes and different transmission and reception parameters may be used for the respective services in order to meet different requirements of the respective services.

Hereinafter, a frame structure of a 5G system will be described in detail with reference to accompanying drawings.

FIG. 1 illustrates the basic structure of a time-frequency domain, which is a radio resource region in which a data or control channel is transmitted in a 5G system.

In FIG. 1, the horizontal axis represents a time domain, and the vertical axis represents a frequency domain. The basic unit of a resource in the time-frequency domain is a resource element (RE) 101, which may be defined by one orthogonal frequency division multiplexing (OFDM) symbol 102 on the time axis and one subcarrier 103 on the frequency axis. In the frequency domain, $N_{sc}^{RB}$ (e.g., 12) consecutive REs may form one resource block (RB) 104.

Figure 2:
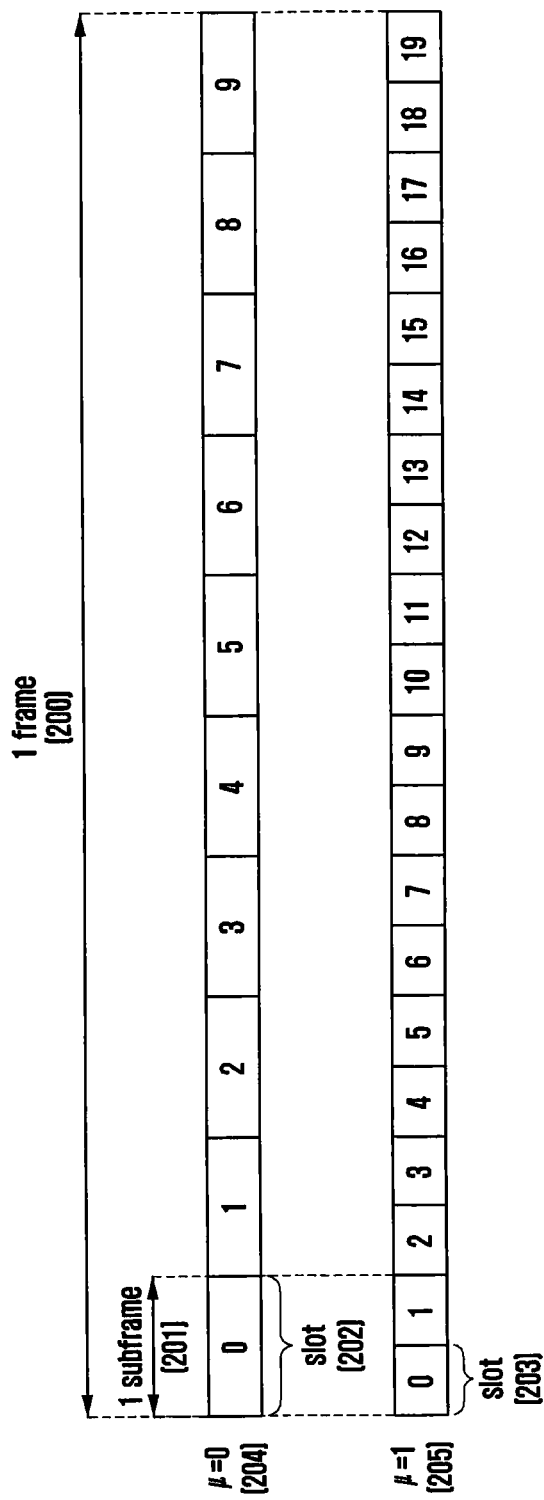
FIG. 2 illustrates a slot structure in a 5G system.

FIG. 2 illustrates a slot structure considered in a 5G system.

FIG. 2 illustrates one example of structures of a frame 200, a subframe 201, and a slot 202. One frame 200 may be defined as 10 ms. One subframe 201 may be defined as 1 ms. Therefore, one frame 200 may include a total of ten subframes 201. One slot 202 and 203 may be defined as 14 OFDM symbols (i.e., the number of symbols per slot ($N_{symb}^{slot}$)=14). One subframe 201 may include one or a plurality of slots 202 and 203, and the number of slots 202 and 203 per subframe 201 may vary depending on a set subcarrier spacing value μ 204 and 205. In the example of FIG. 2, as the set subcarrier spacing value, μ=0 (204) and μ=1 (205). When μ=0 (204), one subframe 201 may include one slot 202; when μ=1 (205), one subframe 201 may include two slots 203. That is, the number of slots per subframe ($N_{slot}^{subframe,\mu}$) may vary depending on the set subcarrier spacing value μ, and the number of slots per frame ($N_{slot}^{frame,\mu}$)) may vary accordingly. $N_{slot}^{subframe,\mu}$ and $N_{slot}^{frame,\mu}$ according to each subcarrier spacing setting μ may be defined as in Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Hereinafter, downlink control information (DCI) in a 5G system will be described in detail.

In a 5G system, scheduling information for uplink data (or a physical uplink shared channel (PUSCH)) or downlink data (or a physical downlink shared channel (PDSCH)) is provided from a base station to a UE through DCI. The UE may monitor a fallback DCI format and a non-fallback DCI format for a PUSCH or PDSCH. The fallback DCI format may be configured with a fixed field predefined between the base station and the UE, and the non-fallback DCI format may include a configurable field.

Fallback DCI for scheduling a PUSCH may include, for example, the following pieces of information.

TABLE 2

- Identifier for DCI formats - [1] bit
- Frequency domain resource assignment -
[ ⌈ $\log_2(N_{RB}^{UL,BWP}(N_{RB}^{UL,BWP}+1)/2)$ ⌉ ] bits
- Time domain resource assignment - X bits
- Frequency hopping flag - 1 bit
- Modulation and coding scheme - [5] bits
New data indicator - 1 bit
Redundancy version - [2] bits
HARQ process number - [4] bits
Transmit power control (TPC) command for scheduled PUSCH - [2] bits
UL/supplementary UL (SUL) indicator - 0 or 1 bit Non-fallback DCI for scheduling a PUSCH may include, for example, the following pieces of information.

TABLE 3

Carrier indicator - 0 or 3 bits
Identifier for DCI formats - [1] bit
Bandwidth part indicator - 0, 1, or 2 bits
Frequency domain resource assignment
For resource allocation type 0: ⌈$N_{RB}^{UL,BWP}/P$⌉ bits
For resource allocation type 1: ⌈$\log_2(N_{RB}^{UL,BWP}(N_{RB}^{UL,BWP}+1)/2)$⌉ bits
Time domain resource assignment - 1, 2, 3, or 4 bits
Virtual resource block (VRB)-to-physical resource block (PRB) mapping - 0 or 1 bit, only for resource allocation type 1
 * 0 bit if only resource allocation type 0 is configured;
 * 1 bit otherwise
-Frequency hopping flag - 0 or 1 bit, only for resource allocation type 1.
 * 0 bit if only resource allocation type 0 is configured
 * 1 bit otherwise
Modulation and coding scheme - 5 bits
New data indicator - 1 bit
Redundancy version - 2 bits as defined in section x.x of [6, TS38.214]
- HARQ process number - 4 bits
1st downlink assignment index - 1 or 2 bits
1 bit for semi-static HARQ-ACK codebook
2 bits for dynamic HARQ-ACK codebook with single HARQ-ACK codebook
2nd downlink assignment index - 0 or 2 bits
 * 2 bits for dynamic HARQ-ACK codebook with two HARQ-ACK sub-codebooks
 * 0 bit otherwise
TPC command for scheduled PUSCH - 2 bits $$SRS \text{ resource indicator } - \left\lceil \log_2\left(\sum_{k=1}^{L_{max}} \binom{N_{SRS}}{k}\right) \right\rceil \text{ or } \lceil\log_2(N_{SRS})\rceil \text{ bits}$$

$$* \left\lceil \log_2\left(\sum_{k=1}^{L_{max}} \binom{N_{SRS}}{k}\right) \right\rceil \text{ bits for non-codebook-based } PUSCH$$

transmission
 * ⌈$\log_2(N_{SRS})$⌉ bits for codebook-based PUSCH transmission
Precoding information and number of layers - up to 6 bits
Antenna ports - up to 5 bits
SRS request - 2 bits
CSI request - 0, 1, 2, 3, 4, 5, or 6 bits
Code block group (CBG) transmission information - 0, 2, 4, 6, or 8 bits
PTRS-DMRS association - 2 bits.
beta_offset indicator - 2 bits
DMRS sequence initialization - 0 or 1 bit
UL/SUL indicator - 0 or 1 bit Fallback DCI for scheduling a PDSCH may include, for example, the following pieces of information.

TABLE 4

Identifier for DCI formats - [1] bit
Frequency domain resource assignment -
[ $\log_2(N_{RB}^{DL,BWP}(N_{RB}^{DL,BWP}+1)/2)$ ] bits
Time domain resource assignment - X bits
VRB-to-PRB mapping - 1 bit
Modulation and coding scheme - [5] bits
New data indicator - 1 bit
Redundancy version - [2] bits
HARQ process number - [4] bits
Downlink assignment index - 2 bits
TPC command for scheduled PUCCH - [2] bits
Physical uplink control channel (PUCCH) resource indicator - [2] bits
PDSCH-to-HARQ feedback timing indicator - [3] bits Non-fallback DCI for scheduling a PDSCH may include, for example, the following pieces of information.

TABLE 5

Carrier indicator - 0 or 3 bits
Identifier for DCI formats - [1] bits
Bandwidth part indicator - 0, 1 or 2 bits
Frequency domain resource assignment
* For resource allocation type 0: [ $N_{RB}^{DL,BWP}/P$ ] bits
* For resource allocation type 1: [ $\log_2(N_{RB}^{DL,BWP}(N_{RB}^{DL,BWP}+1)/2)$ ] bits
Time domain resource assignment - 1, 2, 3, or 4 bits
VRB-to-PRB mapping - 0 or 1 bit, only for resource allocation type 1.
* 0 bit if only resource allocation type 0 is configured
* 1 bit otherwise
- PRB bundling size indicator - 1 bit
Rate matching indicator - 0, 1, 2 bits
ZP CSI-RS trigger - X bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 4 bits
TPC command for scheduled PUCCH - 2 bits
PUCCH resource indicator
PDSCH-to-HARQ_feedback timing indicator - 3 bits
Antenna ports - up to 5 bits
Transmission configuration indication - 3 bits
SRS request - 2 bits
CBG transmission information - 0, 2, 4, 6, or 8 bits
CBG flushing-out information - 0 or 1 bit
DMRS sequence initialization - 0 or 1 bit The DCI may be transmitted through a physical downlink control channel (PDCCH) via channel coding and modulation. A cyclic redundancy check (CRC) is attached to the payload of a DCI message and is scrambled with a radio network temporary identifier (RNTI) corresponding to the identity of a UE. Different RNTIs are used depending on the purpose of the DCI message, for example, UE-specific data transmission, a power control command, or a random access response. That is, an RNTI is not explicitly transmitted but is included in a CRC calculation process. Upon receiving the DCI message transmitted on the PDCCH, the UE may identify the CRC using the allocated RNTI, and may recognize that the message is transmitted to the UE when the CRC is correct.

For example, DCI for scheduling a PDSCH for system information (SI) may be scrambled with an SI-RNTI. DCI for scheduling a PDSCH for a random access response (RAR) message may be scrambled with an RA-RNTI. DCI for scheduling a PDSCH for a paging message may be scrambled with a P-RNTI. DCI for notifying a slot format indicator (SFI) may be scrambled with an SFI-RNTI. DCI for notifying transmit power control (TPC) may be scrambled with a TPC-RNTI. DCI for scheduling a UE-specific PDSCH or a PUSCH may be scrambled with a cell RNTI (C-RNTI).

Next, a method for transmitting a PUSCH in a 5G system will be described in detail. Hereinafter, PUSCH transmission may be interchanged with uplink data transmission on a PUSCH.

Methods by which a UE transmits a PUSCH to a base station may be classified into a grant-based transmission method and a grant-free transmission method.

In a grant-based PUSCH transmission method, when there is traffic to be transmitted to a base station, a UE may transmit a scheduling request message to the base station via a PUCCH, and the base station receiving the scheduling request message may transmit uplink scheduling DCI corresponding to a scheduling grant to the UE. The UE may receive the uplink scheduling DCI through monitoring of a PDCCH and may transmit a PUSCH to the base station, based on control information notified via the DCI.

In a grant-free PUSCH transmission method, a base station may first configure semi-static time and/or frequency resources for a UE through higher-layer signaling (e.g., radio resource control (RRC) signaling), and the UE may immediately transmit a PUSCH via the configured time and/or frequency resources without a grant from the base station when there is traffic to be transmitted to the base station.

Next, a structure of a transmitter for uplink non-orthogonal multiple access (NOMA) under consideration in a 5G system will be described in detail.

Figure 3A:
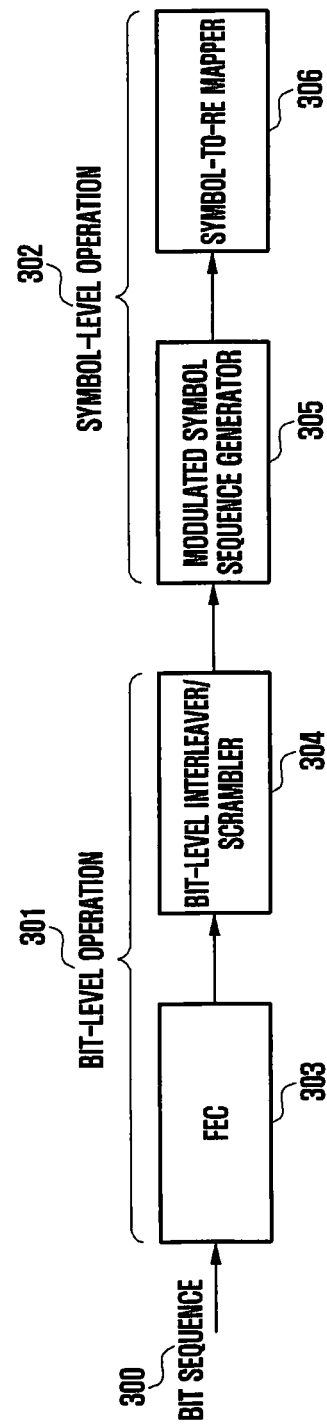
FIG. 3A illustrates a structure of a transmitter in a non-orthogonal multiple access mode in a 5G system.

FIG. 3A illustrates a structure of a transmitter for NOMA discussed in a 5G system.

According to FIG. 3A, operations performed in the transmitter for NOMA may include a bit-level operation 301 and a symbol-level operation 302.

A device for performing the bit-level operation 301 may include a forward error correction (FEC) 303 and a bit-level interleaver/scrambler 304. The FEC 303 may perform channel coding on an input bit sequence 300. Further, the FEC 303 may repeat the input bit sequence. The bit-level interleaver/scrambler 304 may perform interleaving and scrambling on an output bit via the FEC 303. An interleaver/scrambler to be used in a block of the bit-level interleaver/scrambler 304 may be cell-specific or UE-specific, thus randomizing interference to other UEs transmitting a signal using the same time and frequency resources.

A device for performing the symbol-level operation 302 may include a modulated symbol sequence generator 305 and a symbol-to-RE mapper 306. A block of the modulated symbol sequence generator 305 and the symbol-to-RE mapper 306 block may perform single or multiple tone modulation, UE-specific symbol spreading (through repetition), cell- or/and UE-specific symbol-level interleaving/scrambling, sparse or non-sparse resource mapping, transmit power control, and the like may be performed.

The transmitter for NOMA is not limited to the structure illustrated in FIG. 3A, and the above operations may be performed by other structures.

Figure 3B:
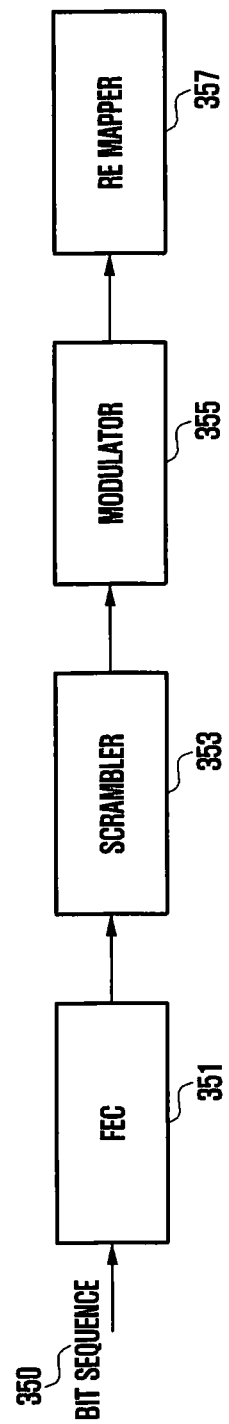
FIG. 3B illustrates a structure of a transmitter in an orthogonal multiple access mode.

FIG. 3B illustrates a structure of a transmitter for orthogonal multiple access (OMA). According to FIG. 3B, the transmitter for OMA may include an FEC 351 to perform channel coding, a scrambler 353 to perform cell-specific and/or UE-specific scrambling, a modulator 355 to generate a modulation symbol, and an RE mapper 357 to map a modulated symbol to an RE. When the transmitter operates for NOMA, each device illustrated in FIG. 3A may be added to the structure of FIG. 3B, or a function performed by a device illustrated in FIG. 3A may be performed by a device of FIG. 3B. For example, the modulated symbol sequence generator 305 may be disposed between the modulator 355 and the RE mapper 357, or a function performed by the modulated symbol sequence generator 305, such as modulation and modulation symbol repetition, may be performed by the modulator 355. The transmitter is not limited to the structure illustrated in FIG. 3B, and equivalent functions may be performed by other structures.

UEs operating according to NOMA may modulate uplink data to be transmitted according to the foregoing transmission structure and may transmit the modulated uplink data to a base station through a PUSCH. Here, a plurality of UEs performing NOMA may simultaneously transmit a PUSCH thereof on the same time and frequency resource. Therefore, the PUSCHs transmitted by the plurality of UEs may act as interference to each other. The base station receiving the PUSCHs from the plurality of UEs performing NOMA may recover uplink data of each UE using a receiver considering the transmission structure.

The disclosure considers a communication system supporting uplink NOMA. The disclosure also considers grant-based PUSCH transmission described above. That is, a UE having uplink data traffic may perform a scheduling request, and a base station may notify the UE of a grant of the scheduling request. A plurality of UEs receiving a scheduling grant may perform PUSCH transmission on a specific time and frequency resource indicated by the base station according to an NOMA transmission scheme. The base station may receive PUSCHs from the plurality of UEs and may recover signals using a receiver considering the NOMA transmission scheme.

In operating grant-based NOMA considered in the disclosure, simultaneous access of a very large number UEs may be supported, thus significantly increasing transmission overhead of a downlink control signal indicating this access. Therefore, the disclosure proposes a method for efficiently transmitting control information transmission method in view of characteristics of NOMA.

Hereinafter, embodiments of the disclosure will be described in detail with reference to the accompanying drawings. Although embodiments of the disclosure will be described with reference to a 5G communication system as an example, these embodiments of the disclosure may also be applied to other communication systems having a similar technical background or channel form. Not only a 5G communication system but also LTE and LTE-A communication systems or a post-5G system may be included in these systems. That is, the embodiments of the disclosure may be partially modified and applied to other communication systems by a person skilled in the art without departing from the scope of the disclosure.

When detailed descriptions about related known functions or configurations are determined to make the gist of the disclosure unclear in describing the disclosure, the detailed descriptions will be omitted herein. Also, terms used below are defined in view of functions in the disclosure and thus may be changed depending on the user, the intent of an operator, or the custom. Accordingly, the terms should be defined based on the following overall description of this specification.

Embodiment 1

Embodiment 1 of the disclosure proposes a method for operating grant-based uplink NOMA.

A UE may support both an NOMA transmission mode and an OMA transmission mode. The NOMA transmission mode may refer to a transmission mode using a transmission scheme for NOMA described above with reference to FIG. 3A. That is, a UE transmitting in the NOMA mode may perform the bit-level operation 301 and the symbol-level operation 302 of FIG. 3A in addition to the operation of FIG. 3B, thereby modulating a symbol and transmitting data. When the NOMA transmission mode is performed, a base station may schedule the same time and frequency resource for a plurality of UEs, and accordingly the plurality of UEs using the NOMA transmission scheme may simultaneously transmit uplink data via the scheduled resources.

The OMA transmission mode may refer to a method by which a UE transmits a symbol which has been subjected OFDM or discrete Fourier transform spreading OFDM (DFT-s-OFDM) modulation without additionally performing the operation of FIG. 3A in transmitting uplink data (or may be understood as a method for transmitting data by performing the operation of FIG. 3B). A base station may schedule non-overlapping time and frequency resources for respective UEs operating in the OMA transmission mode, and the UEs may transmit uplink data in the scheduled resources, respectively. The OMA transmission mode may be interpreted as a default transmission mode (transmission mode in which an additional transmission scheme for NOMA transmission is not applied) other than the NOMA transmission mode. In the disclosure, the default transmission mode is defined as the OMA transmission mode for convenience of explanation.

Hereinafter, a procedure of a base station and a UE for grant-based NOMA transmission will be described in detail.

Embodiment 1-1

Figure 4:
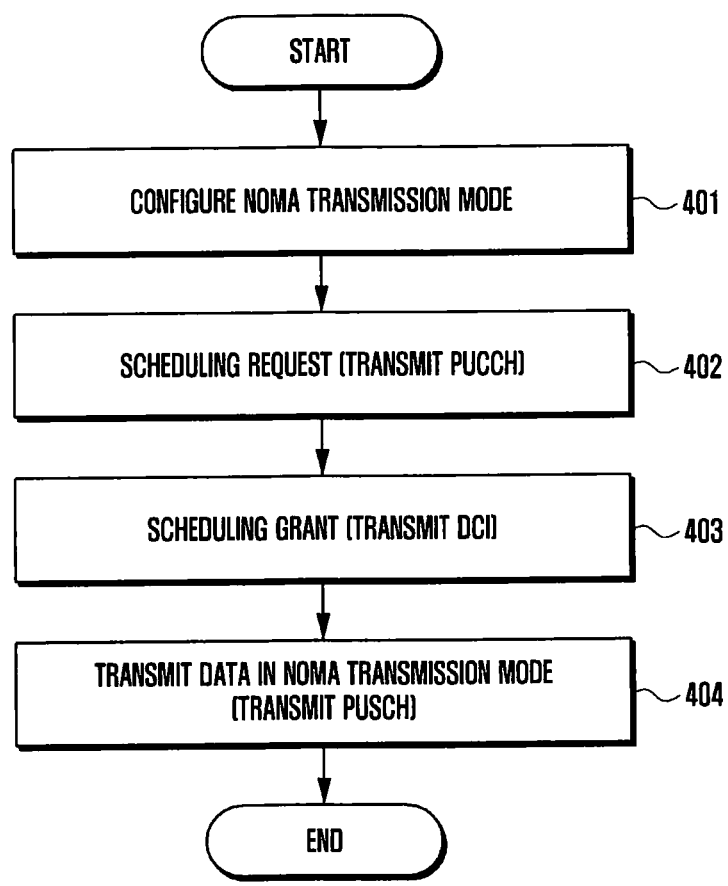
FIG. 4 illustrates a procedure of a base station and a UE according to embodiment 1-1 of the disclosure.

FIG. 4 illustrates a procedure of a base station and a UE according to embodiment 1-1 of the disclosure. In embodiment 1-1 of the disclosure, the base station may semi-statically configure the NOMA transmission mode for the UE, and the UE configured in the NOMA transmission mode may perform PUSCH transmission according to an NOMA transmission structure.

In operation 401, the base station may configure the NOMA transmission mode for the UE via higher-layer signaling (e.g., UE-specific RRC signaling, system information, or medium access control (MAC) control element (CE) signaling). When the base station configures the NOMA transmission mode for the UE, the following methods may be considered.

[Method 1]

The base station may directly notify the UE to perform transmission in the NOMA transmission mode through higher-layer signaling.

[Method 2]

The base station may configure the UE to monitor a specific DCI field necessary for an NOMA operation. DCI may include an additional field to enable an operation in the NOMA transmission mode. For example, one or a plurality of the following fields may be additionally included and transmitted in the DCI.

Bit repetition: Indicates the number of repetitions of a bit sequence to be applied by the UE.

Bit interleaver index: Indicates the index of a bit interleaver to be used by the UE.

Bit scrambler index: Indicates the index of a scrambling code to be used by the UE.

Symbol spreading factor: Indicates the number of repetitions (spreading degree) of a symbol sequence to be applied by the UE.

Codebook index: Indicates the index of a codebook to be used by the UE.

Symbol interleaver index: Indicates the index of a symbol interleaver to be used by the UE.

Symbol scrambler index: Indicates the index of a symbol scrambling code to be used by the UE.

In method 2, the base station may configure at least one of the additional fields of the DCI for the UE. Here, the DCI may be scrambled with a UE-specific RNTI.

[Method 3]

The base station may notify the UE to monitor a specific DCI format for NOMA. For example, when a DCI format indicating a scheduling grant for uplink data in the NOMA transmission mode is DCI format A, the base station may configure the UE to monitor DCI format A for NOMA transmission of the UE. Here, DCI may be scrambled with a UE-specific RNTI.

[Method 4]

The base station may notify the UE to monitor a DCI format scrambled with a specific RNTI for NOMA. For example, a CRC of DCI indicating a scheduling grant for uplink data in the NOMA transmission mode may be scrambled with an N-RNTI, and the base station may configure the UE to monitor the DCI scrambled with the N-RNTI.

The configuration may be set for each bandwidth part for the UE. When a plurality of bandwidth parts is configured for the UE, the NOMA transmission mode may be set for each bandwidth part. For example, when bandwidth part #0 and bandwidth part #1 are configured for the UE, the base station may set the OMA transmission mode for bandwidth part #0 and may set the NOMA transmission mode for bandwidth part #1. Here, when bandwidth part #0 corresponds to a default bandwidth part, it may be assumed that the UE always uses the OMA transmission mode for the default bandwidth part.

In operation 402, the UE may transmit a scheduling request for uplink data. The scheduling request of the UE may be transmitted from the UE to the base station through a PUCCH transmission resource preconfigured by the base station for the UE.

In operation 403, the base station may transmit uplink DCI according to a scheduling grant to the UE. The UE performing the scheduling request may detect the uplink DCI through monitoring of a PDCCH.

In operation 404, when the UE detects the uplink DCI corresponding to the scheduling grant, the UE may perform PUSCH transmission, based on the DCI. Here, the UE may perform the PUSCH transmission by additionally performing the bit-level operation 301 and the symbol-level operation 302 of FIG. 3A according to the NOMA transmission mode.

Embodiment 1-2

Figure 5:
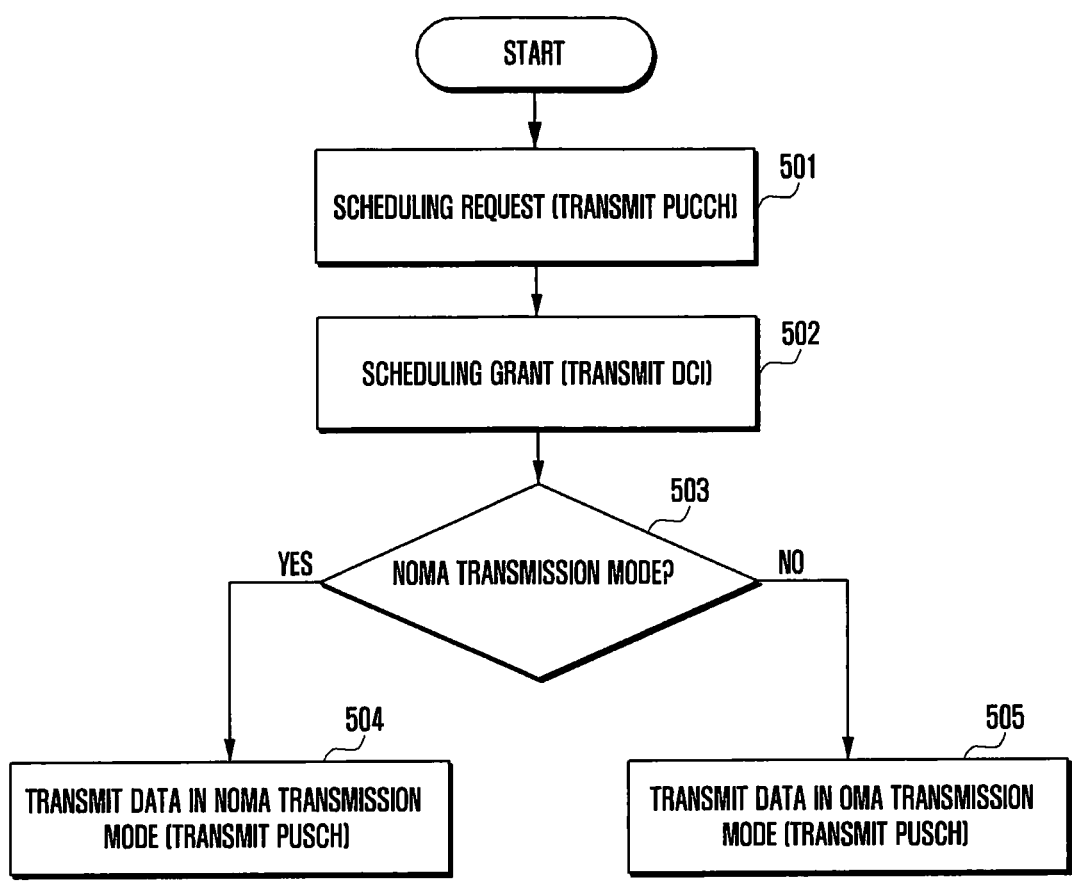
FIG. 5 illustrates a procedure of a base station and a UE according to embodiment 1-2 of the disclosure.

FIG. 5 illustrates a procedure of a base station and a UE according to embodiment 1-2 of the disclosure. In embodiment 1-2 of the disclosure, the base station may dynamically configure and change the NOMA transmission mode for the UE, and an indicator indicating the configuration of the NOMA transmission mode may be notified from the base station to the UE through DCI. When the DCI indicates the configuration of the OMA transmission mode, the UE may perform existing OMA-based PUSCH transmission without the additional operation of FIG. 3A. When the DCI indicates the configuration of the NOMA transmission mode, the UE may perform NOMA-based PUSCH transmission by applying the additional operation of FIG. 3A.

In operation 501, the UE may transmit a scheduling request for uplink data. The scheduling request of the UE may be transmitted from the UE to the base station through a PUCCH transmission resource preconfigured by the base station for the UE.

In operation 502, the base station may transmit uplink DCI according to a scheduling grant to the UE. Here, the base station may select one of transmission modes for PUSCH transmission, that is, the OMA or NOMA transmission mode, and may notify the UE of the selected transmission mode. When the base station indicates the configuration of the NOMA transmission mode to the UE, the following methods may be considered.

[Method 1]

The base station may directly instruct the UE to transmit data in the NOMA transmission mode using an independent DCI field. For example, a one-bit indicator indicating the OMA or NOMA transmission mode may be transmitted via a DCI field.

[Method 2]

A specific DCI field necessary for an NOMA operation may be transmitted to the UE. The DCI may include an additional field to enable an operation in the NOMA transmission mode. For example, one or a plurality of the following fields may be additionally included and transmitted in the DCI.

Bit repetition: Indicates the number of repetitions of a bit sequence to be applied by the UE.

Bit interleaver index: Indicates the index of a bit interleaver to be used by the UE.

Bit scrambler index: Indicates the index of a scrambling code to be used by the UE.

Symbol spreading factor: Indicates the number of repetitions (spreading degree) of a symbol sequence to be applied by the UE.

Codebook index: Indicates the index of a codebook to be used by the UE.

Symbol interleaver index: Indicates the index of a symbol interleaver to be used by the UE.

Symbol scrambler index: Indicates the index of a symbol scrambling code to be used by the UE.

In method 2, the base station may transmit a parameter related to NOMA transmission to the UE through the additional field of the DCI, and the UE receiving the NOMA-related parameter may perform data transmission assuming that the NOMA transmission mode is configured.

In operation 503, the UE may detect the uplink DCI corresponding to the scheduling grant transmitted from the base station through PDCCH monitoring and may determine whether the NOMA transmission mode is configured from the detected DCI. The UE determining whether the NOMA transmission mode is configured may refer to whether an NOMA transmission mode indicator or a parameter indicator related to the NOMA transmission mode, notified by the base station to the UE in operation 502, is obtained. When the NOMA transmission mode indicator or the related parameter indicator is obtained, the UE determines that the NOMA transmission mode is configured.

When it is determined in operation 503 that the NOMA transmission mode is configured, the UE may perform PUSCH transmission in the NOMA transmission mode in operation 504. When it is not determined in operation 503 that the NOMA transmission mode is configured, the UE may perform PUSCH transmission in the OMA transmission mode.

Embodiment 1-3

Figure 6:
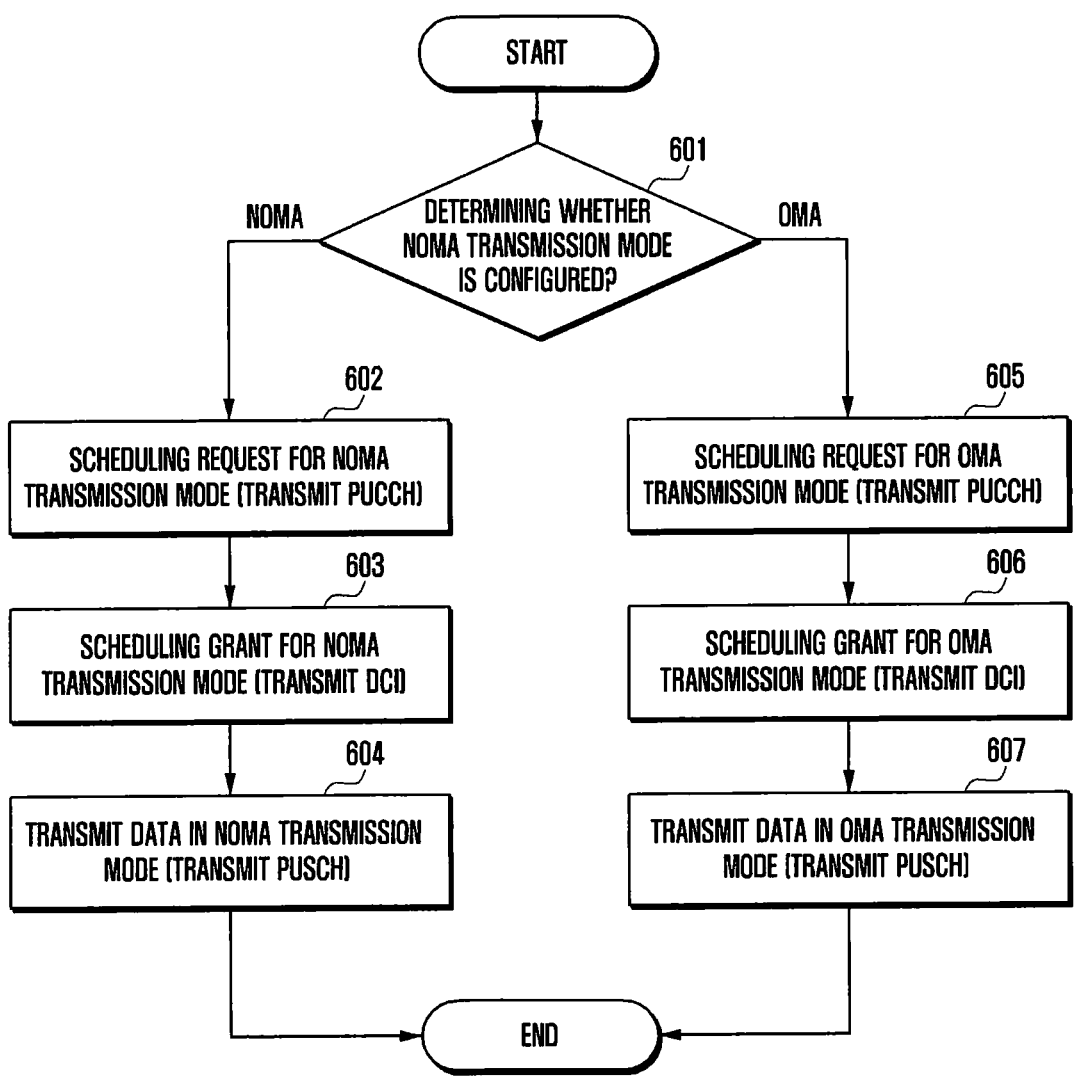
FIG. 6 illustrates a procedure of a base station and a UE according to embodiment 1-3 of the disclosure.

FIG. 6 illustrates a procedure of a base station and a UE according to embodiment 1-3 of the disclosure. In embodiment 1-3 of the disclosure, the UE may directly determine whether to apply the NOMA transmission mode to PUSCH transmission and may transmit a corresponding scheduling request to the base station. When receiving the scheduling request for the NOMA mode, the base station may transmit PUSCH scheduling DCI corresponding to the NOMA transmission mode to the UE. When receiving a scheduling request for the OMA mode, the base station may transmit PUSCH scheduling DCI corresponding to the OMA transmission mode to the UE.

In operation 601, the UE may determine whether to apply the NOMA transmission mode. The UE may determine whether to apply the NOMA transmission mode by the following methods.

[Method 1]

The UE may determine whether to apply the NOMA transmission mode according to the traffic type of data to be transmitted. For example, the UE may determine to apply the NOMA transmission mode to mMTC traffic or URLLC traffic and may determine to apply the OMA transmission mode to eMBB traffic.

[Method 2]

The UE may determine whether to apply the NOMA transmission mode according to the packet size of traffic of data to be transmitted. For example, when the packet size is smaller than $\eta$, the UE may determine to apply the NOMA transmission mode; when the packet size is equal to or greater than $\eta$, the UE may determine to apply the OMA transmission mode. Here, $\eta$ may correspond to a threshold value predefined for the packet size to determine the NOMA transmission mode. $\eta$ may be predefined or set.

When the UE determines to apply the NOMA transmission mode in operation 601, the UE may transmit a scheduling request for the NOMA transmission mode in operation 602. In operation 603, the base station may receive the scheduling request for the NOMA transmission mode and may transmit uplink DCI corresponding to a scheduling grant to the UE. The UE may receive the uplink DCI through monitoring of a PDCCH, and may perform PUSCH transmission in the NOMA transmission mode according to the DCI in operation 604.

When the UE determines to apply the OMA transmission mode in operation 601, the UE may transmit a scheduling request for the OMA transmission mode in operation 605. In operation 606, the base station may receive the scheduling request for the OMA transmission mode and may transmit uplink DCI corresponding to a scheduling grant to the UE. The UE receive the uplink DCI through monitoring of a PDCCH, and may perform PUSCH transmission in the OMA transmission mode according to the DCI in operation 607.

In operation 602 and operation 605, the UE may transmit the scheduling requests for the NOMA and OMA transmission modes by the following methods.

[Method 1]

The UE may transmit a scheduling request by selecting a different PUCCH transmission resource for transmitting the scheduling request according to the NOMA or OMA transmission mode. Specifically, the base station may configure, for the UE, a PUCCH resource for transmitting a scheduling request for OMA (referred to as a first PUCCH resource) and a PUCCH resource for transmitting a scheduling request for NOMA (referred to as a second PUCCH resource). When the UE transmits a scheduling request for the NOMA transmission mode, the UE may transmit the scheduling request via the second PUCCH resource. Here, the first PUCCH resource and the second PUCCH resource may be separated on time and/or frequency resources or may be divided using a code or a sequence.

[Method 2]

The UE may transmit an N-bit (where N=1) indicator to the base station for a scheduling request, and may transmit a different indicator according to the NOMA or OMA transmission mode. For example, the UE may transmit a two-bit indicator to the base station on a PUCCH for a scheduling request, may transmit an indicator [1 0] for a scheduling request for the NOMA transmission mode, and may transmit an indicator [0 1] for a scheduling request for the OMA transmission mode. The indicator may be applied without being limited to the above.

Embodiment 2

Embodiment 2 of the disclosure proposes a downlink control information signaling method for a grant-based uplink NOMA operation.

Embodiment 2-1

Figure 7:
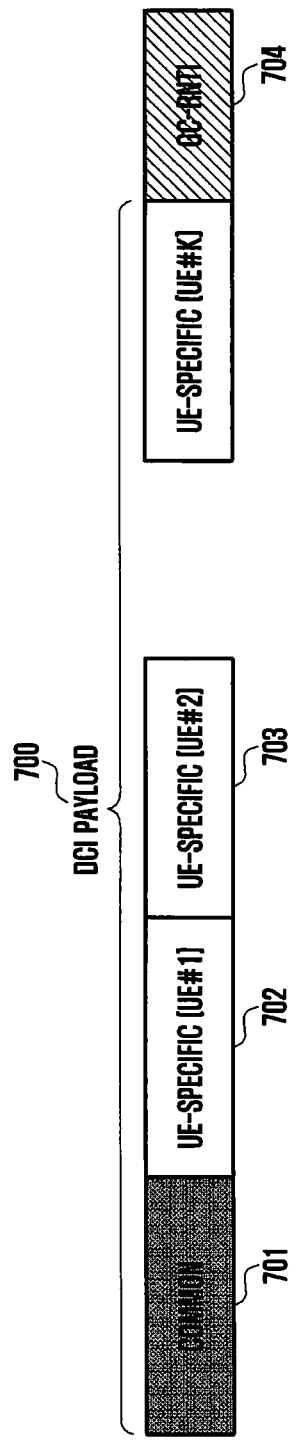
FIG. 7 illustrates a DCI structure according to embodiment 2-1 of the disclosure.

FIG. 7 illustrates a DCI structure according to embodiment 2-1 of the disclosure. As illustrated in FIG. 7, an entire DCI payload 700 may include a common (or group-common and UE-group-common) control information portion 701 and UE-specific control information portions 702, 703, and the like. The common control information portion 701 may include fields corresponding to control information that is commonly applicable to all UEs detecting corresponding DCI, and a UE-specific control information portion 702 may include fields corresponding to control information that is UE-specifically applicable.

Common control information 701 may include, for example, DCI fields corresponding to time and frequency resource allocation information. The base station may allocate the same time and frequency resource to a plurality of UEs operating in NOMA, and the UEs may transmit a PUSCH in a scheduled time and frequency resource by applying an NOMA transmission method. Therefore, the base station will notify the plurality of UEs operating in NOMA of the same time and frequency resource allocation information through DCI. Accordingly, the time and frequency resource allocation information may correspond to the common control information 702 for the plurality of UEs operating in NOMA. In another example, the common control information 701 may include a DCI field related to a symbol modulation scheme. The base station may instruct all the plurality of UEs operating in NOMA to use a symbol modulation scheme having the same modulation order through the DCI. For example, the base station may notify the plurality of UEs operating in NOMA to use Quadrature Phase Shift Keying (QPSK), which may be required for the base station to efficiently process interference of the UEs performing reception in the NOMA transmission mode.

DCI fields available for the common control information 701 are listed below in Table 6. In Table 6, DCI fields in may be or may not be included in the common control information 701 or may be determined according to a configuration by the base station.

TABLE 6

- {Carrier indicator} - 0 or 3 bits
- {Identifier for DCI formats} - [1] bits
- [Bandwidth part indicator] - 0, 1 or 2 bits
- Frequency domain resource assignment
* For resource allocation type 0, $\lceil N_{RB}^{DL,BWP}/P \rceil$ bits
* For resource allocation type 1, $\lceil \log_2 (N_{RB}^{DL,BWP}(N_{RB}^{DL,BWP}+1)/2) \rceil$ bits
- Time domain resource assignment -1, 2, 3, or 4 bits
- VRB-to-PRB mapping - 0 or 1 bit, only for resource allocation type 1.
* 0 bit if only resource allocation type 0 is configured
* 1 bit otherwise
- Frequency hopping flag - 0 or 1 bit, only for resource allocation type 1.
* 0 bit if only resource allocation type 0 is configured
* 1 bit otherwise
- {Modulation and coding scheme} - 5 bits
- {Precoding information and number of layers} - up to 6 bits The UE-specific control information 702 may include, for example, retransmission-related DCI fields (e.g., an HARQ process number, a new data indicator, a redundancy version, a codeblock group (CBG)-related information, a downlink assignment index, and the like). PUSCH transmission of the plurality of UEs operating in NOMA may include not only initial transmission but also retransmission. Here, since whether initial transmission or retransmission of the UEs is performed may vary depending on each UE, all retransmission-related DCI fields may be UE-specific. In another example, the UE-specific control information 702 may include DCI fields related to uplink power control. Uplink power control-related information may be determined depending on the geographical position or the channel state of each UE and may be different for each UE, thus being UE-specific. These fields may include a field of TPC command for scheduled PUSCH or the like. In still another example, the UE-specific control information 702 may include DCI fields related to precoding, because preferred precoding may vary depending on each UE. These fields may include a field of precoding information and number of layers or the like. In addition, pieces of information about a configuration to be set for each UE may be included in the UE-specific control information 702.

DCI fields available for the UE-specific control information 702 are listed below in Table 7.

TABLE 7

- New data indicator - 1 bit
- Redundancy version - 2 bits as defined in section x.x of [6, TS38.214]
- HARQ process number - 4 bits
- 1st downlink assignment index - 1 or 2 bits
* 1 bit for semi-static HARQ-ACK codebook
* 2 bits for dynamic HARQ-ACK codebook with single HARQ-ACK codebook
- 2nd downlink assignment index - 0 or 2 bits
* 2 bits for dynamic HARQ-ACK codebook with two HARQ-ACK sub-codebooks
* 0 bit otherwise
- TPC command for scheduled PUSCH - 2 bits
- SRS resource indicator - $\left\lceil \log_2\left( \sum_{k=1}^{L_{max}} \binom{N_{SRS}}{k} \right) \right\rceil$ or $\lceil \log_2(N_{SRS}) \rceil$ bits
* $\left\lceil \log_2\left( \sum_{k=1}^{L_{max}} \binom{N_{SRS}}{k} \right) \right\rceil$ bits for non-codebook-based PUSCH TABLE 7-continued transmission
* $\lceil \log_2(N_{SRS}) \rceil$ bits for codebook-based PUSCH transmission
- Precoding information and number of layers - up to 6 bits
- Antenna ports - up to 5 bits
- SRS request - 2 bits
- CSI request - 0, 1, 2, 3, 4, 5, or 6 bits
- CBG transmission information - 0, 2, 4, 6, or 8 bits
- PTRS-DMRS association - 2 bits According to the embodiment of FIG. 7, the entire DCI payload 700 may include one piece of common control information 701 and a plurality of pieces of UE-specific control information 702 and 703. The pieces of UE-specific control information 702 and 703 are control information for each UE, and each UE may recognize a bit corresponding to the UE among the pieces of UE-specific control information through a higher-layer configuration (e.g., RRC signaling, system information, MAC CE signaling, or the like) from the base station. For example, in FIG. 7, UE #1 may recognize that 702 is information corresponding to UE #1 among the pieces of UE-specific control information, and UE #2 may recognize that 703 is information corresponding to UE #2 among the pieces of UE-specific control information.

A CRC may be inserted into the DCI for error detection and may be scrambled with a UE-common identifier (e.g., a group-common (GC) RNTI or NOMA RNTI (N-RNTI), hereinafter referred to as a GC-RNTI 704). The base station may configure the plurality of UEs to operate in NOMA to monitor the DCI scrambled with the GC-RNTI 704, and the UEs may monitor the DCI scrambled with the GC-RNTI 704 according to the configuration by the base station. When the DCI is detected, the UEs may distinguish between the piece of common control information 701 and the pieces of UE-specific control information 702 and 703 according to a presetting, may select the common control information 701 and UE-specific control information 702 and 703 corresponding thereto, and may receive downlink control information.

The base station may transmit the DCI scrambled with the GC-NRTI 704 through a common search space and a group-common search space, and the UEs may perform blind decoding on the DCI scrambled with the GC-NRTI 704 in the common search space and the group-common search space.

Embodiment 2-2

Figure 8:
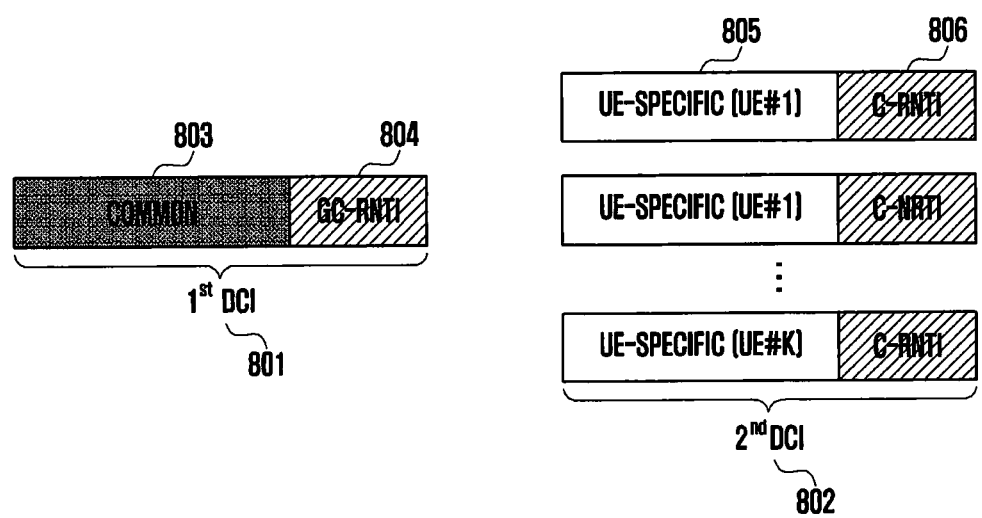
FIG. 8 illustrates a DCI structure according to embodiment 2-2 of the disclosure.

FIG. 8 illustrates a DCI structure according to embodiment 2-2 of the disclosure. In embodiment 2-2 of the disclosure, uplink scheduling DCI may include first DCI 801 and second DCI 802.

The first DCI 801 may include common control information 803, in which a CRC may be scrambled with a UE-common identifier (e.g., a group-common (GC) RNTI or NOMA RNTI (N-RNTI), hereinafter referred to as a GC-RNTI) 804. The common control information 803 may include one or a plurality of the fields in Table 6 illustrated in embodiment 2-1 of the disclosure.

The second DCI 801 may include UE-specific control information 805, in which a CRC may be scrambled with a UE-specific identifier (e.g., a C-RNTI) 806. The UE-specific control information 805 may include one or a plurality of the fields in Table 7 illustrated in embodiment 2-1 of the disclosure.

In embodiment 2-2, the entire DCI may be divided into the first DCI 801, which carries the common control information 803, and the second DCI 802, which carries the UE-specific control information 805, to be transmitted. A UE operating in NOMA may monitor both the first DCI 801 and the second DCI 802 and may obtain control information for PUSCH transmission therefrom.

The base station may configure the UE to operate in NOMA to additionally monitor the first DCI 801, that is, the DCI scrambled with the GC-RNTI 804. The UE may additionally monitor the first DCI 801 according to the configuration by the base station, and may obtain control information for PUSCH transmission in a combination of information corresponding to fields in the first DCI 801 and the second DCI 802 when both the first DCI 801 and the second DCI 802 are detected.

The base station may transmit the first DCI scrambled with the GC-NRTI 804 through a common search space and a group-common search space, and the UE may perform blind decoding on the first DCI scrambled with the GC-NRTI 804 in the common search space and the group-common search space.

The base station may transmit the second DCI scrambled with the C-NRTI 806 through a UE-specific search space, and the UE may perform blind decoding on the second DCI scrambled with the C-NRTI 806 in the UE-specific search space.

Embodiment 2-3

Figure 9:
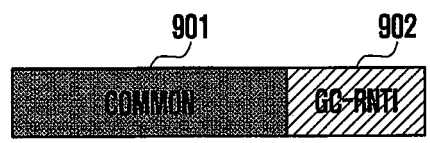
FIG. 9 illustrates a DCI structure according to embodiment 2-3 of the disclosure.

FIG. 9 illustrates a DCI structure according to embodiment 2-3 of the disclosure. As illustrated in FIG. 9, DCI for scheduling a PUSCH transmitted in the NOMA transmission mode may include only fields corresponding to common control information 901 (the common control information 901 may include at least one of the pieces of information illustrated in Table 6). A CRC of the DCI may be scrambled with a GC-RNTI 902. Pieces of UE-specific control information (see Table 7) may be preconfigured by a base station for a UE through higher-layer signaling (e.g., RRC signaling), or it may be omitted notifying UE-specific control information in the NOMA transmission mode.

For example, the NOMA transmission mode may be used only for initial transmission, in which case retransmission-related information in Table 7 may be omitted. For example, all or some of the following DCI fields may be omitted.

New data indicator
Redundancy version
HARQ process number
1st downlink assignment index
2nd downlink assignment index
CBG transmission information Alternatively, when the NOMA transmission mode is applied, multilayer transmission may not be applied, in which case information related to multilayer transmission in Table 7 may be omitted. For example, all or some of the following DCI fields may be omitted.

Precoding information and number of layers
Antenna ports

The base station may configure UEs to operate in the NOMA transmission mode to monitor the DCI scrambled with the GC-RNTI 902. A UE may monitor the DCI scramble with the GC-RNTI 902 for the NOMA transmission mode and may perform PUSCH transmission according to control information indicated by the obtained DCI.

Embodiment 2-4

Figure 10:
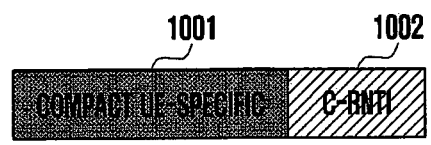
FIG. 10 illustrates a DCI structure according to embodiment 2-3 of the disclosure.

FIG. 10 illustrates a DCI structure according to embodiment 2-4 of the disclosure. As illustrated in FIG. 10, DCI for scheduling a PUSCH transmitted in the NOMA transmission mode may include only fields corresponding to compact UE-specific control information 1001. The compact UE-specific control information 1001 may follow, for example, Table 8 below.

The compact UE-specific control information may be the pieces of control information illustrated in Table 3 one or some of which are omitted or fixed. For example, in Table 8 below, fields in { } may be omitted, and an omitted value may be set by a higher layer or may be a fixed value.

For example, when resource allocation-related information is semi-statically configured or indicated in advance by a higher layer, the resource allocation-related information may be omitted from the compact UE-specific control information. Alternatively, when at least one piece of resource allocation-related information is configured in advance in a higher layer, the UE-specific control information may include only information (or indicator) indicating some of the resource allocation-related information configured in advance. Specifically, a base station may configure N time and/or frequency resource sets for the UE via higher-layer signaling (RRC signaling), and the compact DCI may indicate one of the configured N time and/or frequency resource sets using $\log_2(N)$ bits.

Alternatively, when the NOMA transmission mode is used only for initial transmission or when the NOMA transmission mode does not support multilayer transmission, retransmission-related information or multilayer transmission-related information may be omitted from the UE-specific control information.

TABLE 8

- {Carrier indicator} - 0 or 3 bits
- {Identifier for DCI formats} - [1] bits
- {Bandwidth part indicator} - 0, 1 or 2 bits
- Frequency domain resource assignment
  * For resource allocation type 0, $\lceil N_{RB}^{UL,BWP}/P \rceil$ bits
  * For resource allocation type 1, $\lceil \log_2(N_{RB}^{UL,BWP} (N_{RB}^{UL,BWP} + 1)/2) \rceil$ bits
- {Time domain resource assignment} -1, 2, 3, or 4 bits
- VRB-to-PRB mapping - 0 or 1 bit, only for resource allocation type 1.
  * 0 bit if only resource allocation type 0 is configured
  * 1 bit otherwise
- Frequency hopping flag - 0 or 1 bit, only for resource allocation type 1
  * 0 bit if only resource allocation type 0 is configured
  * 1 bit otherwise
- {Modulation and coding scheme} - 5 bits
- {New data indicator} - 1 bit
- {Redundancy version} - 2 bits as defined in section x.x of [6, TS38.214]
- {HARQ process number} - 4 bits
- {1st downlink assignment index} - 1 or 2 bits
  * 1 bit for semi-static HARQ-ACK codebook
  * 2 bits for dynamic HARQ-ACK codebook with single HARQ-ACK codebook
- {2nd downlink assignment index} - 0 or 2 bits
  * 2 bits for dynamic HARQ-ACK codebook with two HARQ-ACK sub-codebooks
  * 0 bit otherwise
- TPC command for scheduled PUSCH - 2 bits

- {SRS resource indicator} - $\left\lceil \log_2\left(\sum_{k=1}^{L_{max}} \binom{N_{SRS}}{k}\right) \right\rceil$ or $\lceil \log_2(N_{SRS}) \rceil$ bits

* $\left\lceil \log_2\left(\sum_{k=1}^{L_{max}} \binom{N_{SRS}}{k}\right) \right\rceil$ bits for non-codebook-based PUSCH transmission
  * $\lceil \log_2(N_{SRS}) \rceil$ bits for codebook-based PUSCH transmission TABLE 8-continued

- Precoding information and number of layers - up to 6 bits
- Antenna ports - up to 5 bits
- {SRS request} - 2 bits
- {CSI request} - 0, 1, 2, 3, 4, 5, or 6 bits
- {CBG transmission information} - 0, 2, 4, 6, or 8 bits
- {PTRS-DMRS association} - 2 bits A CRC of the compact UE-specific DCI may be scrambled with a C-RNTI 1002.

The base station may configure UEs to operate in NOMA to monitor the compact UE-specific DCI. A UE may monitor the DCI scramble with the C-RNTI 1002 for the NOMA transmission mode and may perform PUSCH transmission according to control information indicated by the obtained DCI.

Figure 11:
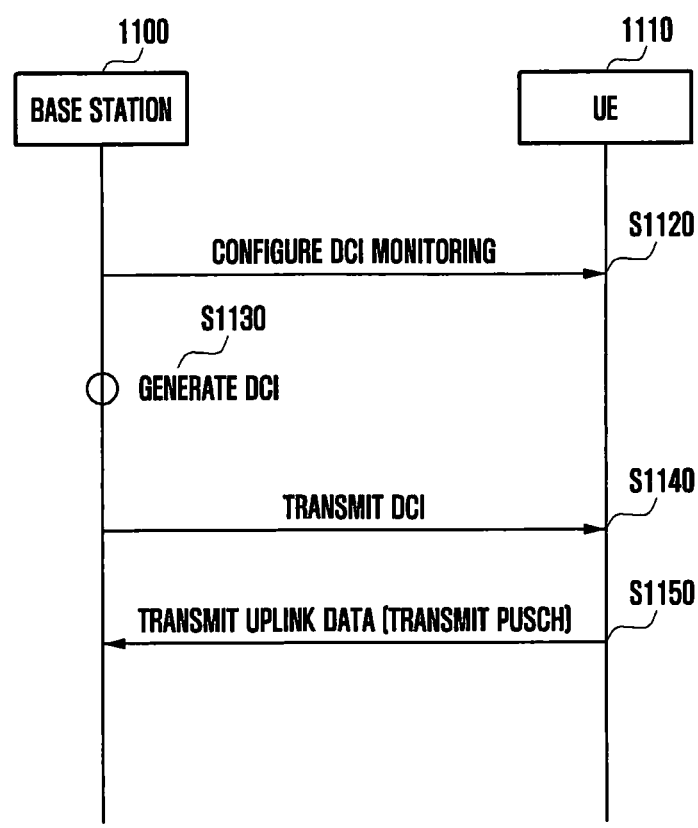
FIG. 11 illustrates the operation of a base station and a UE performing embodiment 2 of the disclosure.

FIG. 11 illustrates the operation of a base station and a UE performing embodiment 2 of the disclosure.

According to FIG. 11, the base station 1100 may configure DCI monitoring for the UE 1110 (S1120). Specifically, in embodiment 2-1, the base station may configure the UE to monitor the DCI scrambled with the GC-RNTI 704; in embodiment 2-2, the base station may configure the UE to monitor the DCI scrambled with the GC-RNTI 804 in addition to the DCI scrambled with the C-RNTI 806. The base station 1100 generates DCI corresponding to the DCI monitoring configured for the UE (S1130). Specifically, in embodiment 2-1, the base station 1100 may generate the common control information 701 and the plurality of pieces of UE-specific control information 702 and 703 and may add the CRC scrambled with the GC-RNTI 704. The base station 1100 transmits the DCI generated according to each embodiment to the UE 1110 (S1140), and the UE monitors the DCI according to the configuration by the base station. When the DCI is detected, the UE 1110 obtains control information according to each embodiment and transmits uplink data to the base station 1100 on a PUSCH according to the control information (S1150).

Figure 12:
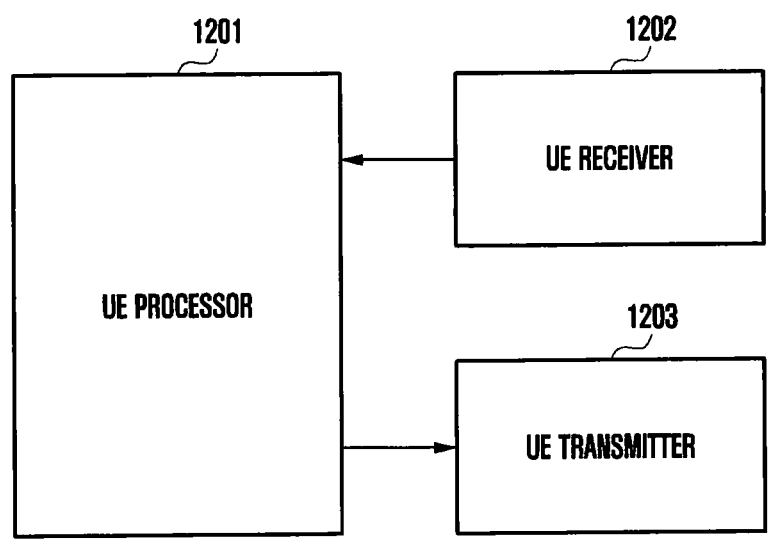
FIG. 12 is a block diagram illustrating an internal structure of a UE according to an embodiment of the disclosure.
Figure 13:
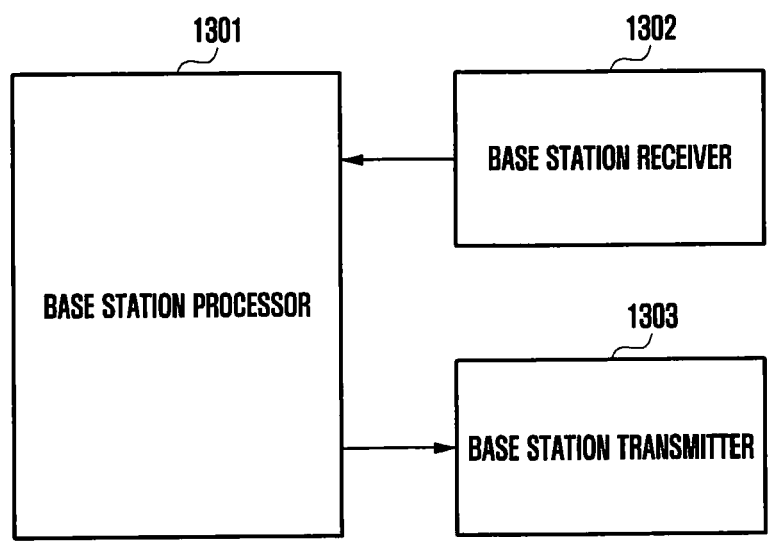
FIG. 13 is a block diagram illustrating an internal structure of a base station according to an embodiment of the disclosure.

In order to carry out the above embodiments of the disclosure, transmitters, receivers, and controllers of a UE and a base station are illustrated in FIG. 12 and FIG. 13, respectively. In order to perform the downlink control information transmission method for supporting non-orthogonal multiple access (NOMA) in the 5G communication system according to the above embodiments, the transmitters, the receivers, and the processors of the base station and the UE need to operate according to the embodiments.

Specifically, FIG. 12 is a block diagram illustrating an internal structure of a UE according to an embodiment of the disclosure. As illustrated in FIG. 12, the UE of the disclosure may include a UE processor 1201, a receiver 1202, and a transmitter 1203.

The UE processor 1201 may control a series of processes in which the UE may operate according to the foregoing embodiments of the disclosure. For example, the UE processor 1201 may control the receiver 1202 and the transmitter 1203 to perform PUSCH transmission according to the NOMA transmission mode, uplink scheduling request transmission, a DCI monitoring method for the NOMA transmission mode, and the like according to the embodiments of the disclosure. The receiver 1202 of the UE and the transmitter 1203 of the UE may be collectively referred to as a transceiver in the embodiment of the disclosure. The transceiver may transmit and receive a signal to and from a base station. The signal may include control information and data. To this end, the transceiver may include an RF transmitter to upconvert and amplify the frequency of a transmitted signal and an RF receiver to low-noise amplify and downconvert a received signal. Also, the transceiver may receive a signal through a radio channel to output the signal to the UE processor 1201 and may transmit a signal output from the UE processor 1201 through a radio channel.

FIG. 13 is a block diagram illustrating an internal structure of a base station according to an embodiment of the disclosure. As illustrated in FIG. 13, the base station of the disclosure may include a base station processor 1301, a receiver 1302, and a transmitter 1303.

The base station processor 1301 may control a series of processes in which the base station may operate according to the foregoing embodiments of the disclosure. For example, the base station processor 1301 may control the receiver 1302 and the transmitter 1303 to perform a method for generating and transmitting uplink grant DCI, a method for configuring an NOMA transmission mode, and the like according to the embodiments of the disclosure. The receiver 1302 of the base station and the transmitter 1303 of the base station may be collectively referred to as a transceiver in the embodiment of the disclosure. The transceiver may transmit and receive a signal to and from a UE. The signal may include control information and data. To this end, the transceiver may include an RF transmitter to upcovert and amplify the frequency of a transmitted signal and an RF receiver to low-noise amplify and downconvert a received signal. Also, the transceiver may receive a signal through a radio channel to output the signal to the base station processor 1301 and may transmit a signal output from the base station processor 1301 through a radio channel.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical spirit of the disclosure. Further, the above respective embodiments may be employed in combination, as necessary.

The invention claimed is:

1. A signal reception method of a base station in a wireless communication system, the method comprising:
transmitting, to a first user equipment (UE), configuration information including a group-common radio network temporary identifier (RNTI) and information indicating to monitor first downlink control information;
obtaining the first downlink control information for a plurality of user equipments (UEs) which is scrambled with the group-common RNTI, the first downlink control information including control information being common to the plurality of UEs;
transmitting, to the plurality of UEs, the first downlink control information based on a group common search space;
obtaining second downlink control information for the first UE among the plurality of UEs which is scrambled with a UE-specific RNTI, the second downlink control information including control information being specific to the first UE;
transmitting, to the first UE, the second downlink control information based on a UE-specific search space; and
receiving data for non-orthogonal multiple access (NOMA) on a time-frequency resource obtained based on the control information being common to the plurality of UEs and the control information being specific to the first UE, from the first UE, wherein the time-frequency resource to receive the data for the NOMA is shared with the plurality of UEs.

2. The method of claim 1, wherein the configuration information is transmitted via higher-layer signaling.

3. The method of claim 1, wherein the control information being common includes at least one of time resource allocation information, frequency resource allocation information, modulation and coding scheme information, or precoding information.

4. The method of claim 3, wherein the control information being specific to the first UE includes at least one of hybrid automatic repeat request (HARQ) process number, new data indicator, or redundancy version information.

5. A signal transmission method of a user equipment (UE) in a wireless communication system, the method comprising:
- receiving configuration information including a group-common radio network temporary identifier (RNTI) and information indicating to monitor first downlink control information;
- receiving the first downlink control information using the group-common RNTI based on a group common search space, the first downlink control information including control information being common to a plurality of UEs, based on the configuration information;
- receiving second downlink control information using a UE-specific RNTI based on a UE-specific search space, the second downlink control information including control information being specific to the UE;
- based on the information being common to the plurality of UEs and the control information being specific to the UE, obtaining a time-frequency resource for transmitting data for non-orthogonal multiple access (NOMA); and
- transmitting the data for the NOMA on the obtained time-frequency resource, wherein the time-frequency resource to transmit the data for the NOMA is shared with the plurality of UEs.

6. The method of claim 5, wherein the configuration information is received via higher-layer signaling.

7. The method of claim 5, wherein the control information being common to the plurality of UEs includes at least one of time resource allocation information, frequency resource allocation information, modulation and coding scheme information, or precoding information.

8. The method of claim 7, wherein the control information being specific to the first UE includes at least one of hybrid automatic repeat request (HARQ) process number, new data indicator, or redundancy version information.

9. A base station for receiving a signal in a wireless communication system, the base station comprising:
- a transceiver; and
- a controller coupled with the transceiver and configured to:
  - transmit, to a first user equipment (UE), configuration information including a group-common radio network temporary identifier (RNTI) and information indicating to monitor first downlink control information,
  - obtain the first downlink control information for a plurality of user equipments (UEs) which is scrambled with the group-common RNTI, the first downlink control information including control information being common to the plurality of UEs,
  - transmit, to the plurality of UEs, the first downlink control information based on a group common search space,
  - obtain second downlink control information for the first UE among the plurality of UEs which is scrambled with a UE-specific RNTI, the second downlink control information including control information being specific to the first UE,
  - transmit, to the first UE, the second downlink control information based on a UE-specific search space, and
  - receive data for non-orthogonal multiple access (NOMA) on a time-frequency resource obtained based on the control information being common to the plurality of UEs and the control information being specific to the first UE, from the first UE, wherein the time-frequency resource to receive the data for the NOMA is shared with the plurality of UEs.

10. The base station of claim 9, wherein the configuration information is transmitted via higher-layer signaling.

11. The base station of claim 9, wherein the control information being common includes at least one of time resource allocation information, frequency resource allocation information, modulation and coding scheme information, or precoding information.

12. The base station of claim 11, wherein the control information being specific to the first UE includes at least one of hybrid automatic repeat request (HARQ) process number, new data indicator, or redundancy version information.

13. A user equipment (UE) for transmitting a signal in a wireless communication system, the UE comprising:
- a transceiver; and
- a controller coupled with the transceiver and configured to:
  - receive configuration information including a group-common radio network temporary identifier (RNTI) and information indicating to monitor first downlink control information,
  - receive the first downlink control information using the group-common RNTI based on a group common search space, the first downlink control information including control information being common to a plurality of UEs, based on the configuration information,
  - receive second downlink control information using a UE-specific RNTI based on a UE-specific search space, the second downlink control information including control information being specific to the UE,
  - based on the information being common to the plurality of UEs and the control information being specific to the UE, obtain a time-frequency resource for transmitting data for non-orthogonal multiple access (NOMA); and
  - transmit the data for the NOMA on the obtained time-frequency resource, wherein the time-frequency resource to transmit the data for the NOMA is shared with the plurality of UEs.

14. The UE of claim 13, wherein the configuration information is received via higher-layer signaling.

15. The UE of claim 13, wherein the control information being common to the plurality of UEs includes at least one of time resource allocation information, frequency resource allocation information, modulation and coding scheme information, or precoding information.

16. The UE of claim 13, wherein the control information being specific to the first UE includes at least one of hybrid automatic repeat request (HARQ) process number, new data indicator, or redundancy version information.

\* \* \* \* \*